(12) United States Patent
Yee et al.

(10) Patent No.: US 7,583,868 B2
(45) Date of Patent: Sep. 1, 2009

(54) 3R RECOVERY SYSTEM

(75) Inventors: Dae Su Yee, Daejeon (KR); Young Ahn Leem, Daejeon (KR); Dong Churl Kim, Daejeon (KR); Kyung Hyun Park, Daejeon (KR); Sung Bock Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 9 days.

(21) Appl. No.: 11/295,414

(22) Filed: Dec. 6, 2005

(65) Prior Publication Data

US 2006/0120659 A1      Jun. 8, 2006

(30) Foreign Application Priority Data

Dec. 8, 2004   (KR)   ............... 10-2004-0103071
Aug. 25, 2005  (KR)   ............... 10-2005-0078384

(51) Int. Cl.
*G02B 6/12*   (2006.01)
*G02B 6/26*   (2006.01)
*G02F 1/01*   (2006.01)
*G02F 1/035*  (2006.01)
*G02F 1/295*  (2006.01)

(52) U.S. Cl. .......... 385/14; 385/1; 385/2; 385/3; 385/8; 385/9; 385/15

(58) Field of Classification Search ........... 385/1–3, 385/8, 9, 14, 15
See application file for complete search history.

(56) References Cited

U.S. PATENT DOCUMENTS

| 5,754,325 | A | * | 5/1998 | Michishita | 398/175 |
| 6,008,926 | A | * | 12/1999 | Moodie et al. | 359/238 |
| 6,563,621 | B2 | * | 5/2003 | Dave et al. | 398/176 |
| 6,701,049 | B1 | * | 3/2004 | Awad et al. | 385/122 |
| 6,954,564 | B2 | * | 10/2005 | Bendett | 385/27 |
| 2002/0174378 | A1 | * | 11/2002 | Chiaroni et al. | 714/15 |
| 2004/0036946 | A1 | * | 2/2004 | Webb et al. | 359/264 |
| 2004/0042800 | A1 | * | 3/2004 | Lawrence | 398/175 |
| 2005/0018721 | A1 | * | 1/2005 | Kish et al. | 372/20 |
| 2005/0094926 | A1 | * | 5/2005 | Dominic et al. | 385/14 |

FOREIGN PATENT DOCUMENTS

WO   WO03/052631   6/2003

OTHER PUBLICATIONS

Sartorius ("All-Optical Clock Recovery for 3R Optical Regeneration," Optical Society of America, 2000).*

* cited by examiner

*Primary Examiner*—Brian M. Healy
*Assistant Examiner*—Hung Lam
(74) *Attorney, Agent, or Firm*—Ladas & Parry LLP

(57) ABSTRACT

A full 3R (re-timing, re-shaping, re-amplifying) recovery system is provided. In the full 3R recovery system, a self-pulsating laser diode (SP-LD) and an electroabsorption modulator (EAM) are integrated and disposed on a semiconductor substrate.

20 Claims, 5 Drawing Sheets

3R RECOVERY SYSTEM

CROSS-REFERENCE TO RELATED PATENT APPLICATIONS

This application claims the benefit of Korean Patent Application Nos. 10-2004-0103071, filed on Dec. 8, 2004 and 10-2005-0078384, filed on Aug. 25, 2005 in the Korean Intellectual Property Office, the disclosures of which incorporated herein in their entirety by reference.

BACKGROUND OF THE INVENTION

1. Field of the Invention

The present invention relates to an optical communication system, and more particularly, to a recovery system performing a 3R (re-timing, re-shaping, re-amplifying) function on an optical signal.

2. Description of the Related Art

During the transmission of an optical signal via an optical cable in an optical communication system, the size of the signal is reduced and the signal is transformed due to the occurrence of diffusion, and thus, the distortion of the signal is unavoidable in optical communication. In order to recover the transformed optical signal into its original state, a 3R (re-timing, re-shaping, re-amplifying) function should be performed, and a 3R recovery system for performing a 3R function is an essential element for establishing a network.

Re-timing, that is, clock recovery, of a 3R function is the extracting of a clock signal from a transformed optical signal and recovering of a signal from the clock signal and the transformed optical signal using a decision circuit. A clock signal can be extracted by using an electrical phase locked loop (PLL) circuit or full light recovery. The electrical PLL circuit has limited speed.

Conventionally, in full 3R recovery, a clock recovery device and a decision device, respectively, for 2R (re-shaping and re-amplifying) are manufactured so that the full 3R function is completed using optical coupling. Due to the optical coupling of the clock recovery device and the decision device, a coupling loss is inevitably generated. Functions of controlling polarization and delay are additionally required such that the structure of a 3R recovery system is complicated.

SUMMARY OF THE INVENTION

The present invention provides an integrated 3R (re-timing, re-shaping, re-amplifying) recovery system which is simply mounted on a semiconductor substrate and which performs a full 3R function.

According to an aspect of the present invention, there is provided a full 3R (re-timing, re-shaping, re-amplifying) recovery system including a self-pulsating laser diode (SP-LD) and an electroabsorption modulator (EAM) integrated and disposed on a semiconductor substrate.

The full 3R recovery system may further include a double-Y-branch passive waveguide connecting structure connecting the SP-LD and the EAM. The double-Y-branch passive waveguide connecting structure may have two opposite input terminals and two opposite output terminals and the EAM and the SP-LD may be respectively integrated in the two output terminals. The full 3R recovery system may further include a passive waveguide including two multi mode-interference (MMI) couplers connecting the SP-LD and the EAM. The full 3R recovery system may further include a straight passive waveguide connecting the SP-LD and the EAM.

According to another aspect of the present invention, there is provided a full 3R (re-timing, re-shaping, re-amplifying) recovery system including: a first passive waveguide that is integrated and disposed on a semiconductor substrate and has a first input terminal; a second passive waveguide that is integrated and disposed on the semiconductor substrate and has a first output terminal; an electroabsorption modulator (EAM) integrated with the semiconductor substrate and integrated in the first output terminal; a third passive waveguide that is integrated and disposed on the semiconductor substrate, has a second output terminal and is connected to the first passive waveguide and the second passive waveguide; a self-pulsating laser diode (SP-LD) integrated with the semiconductor substrate and integrated in the second output terminal; and a fourth passive waveguide that is integrated and disposed on the semiconductor substrate, is connected to the second waveguide and has a second input terminal.

The first passive waveguide, the second passive waveguide and the third passive waveguide, and the fourth passive waveguide, the third passive waveguide and the second passive waveguide may respectively form Y-branch passive waveguides. The full 3R recovery system may further include a multi mode-interference (MMI) coupler disposed in a region where the first passive waveguide and the second passive waveguide are combined with each other, and an MMI coupler in a region where the fourth passive waveguide and the second passive waveguide are connected. The full 3R recovery system may further include a variable optical amplifier (VOA), an optical bandpass filter (OBPF), and a polarization controller (PC) connected to each of the first and second input terminals. The full 3R recovery system may further include an optical amplifier (OA) and an OBPF connected to each of the first and second output terminals.

According to the present invention, an SP-LD is integrated with an EAM such that an integrated 3R recovery system that can be simply mounted on one semiconductor substrate is realized. According to the present invention, since the 3R recovery system has an integrated structure, optical coupling loss is smaller than in the case where separate elements are combined with one another in the prior art, and the configuration of the 3R function is simplified and compact. In addition, monolithic integration is performed such that polarization dependency is reduced. Furthermore, an input signal is simply input such that the optical clock signal and the 3R-recovered optical signal can be obtained and a device in which the 3R function is performed can be realized. In particular, the 3R function can be performed using one signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
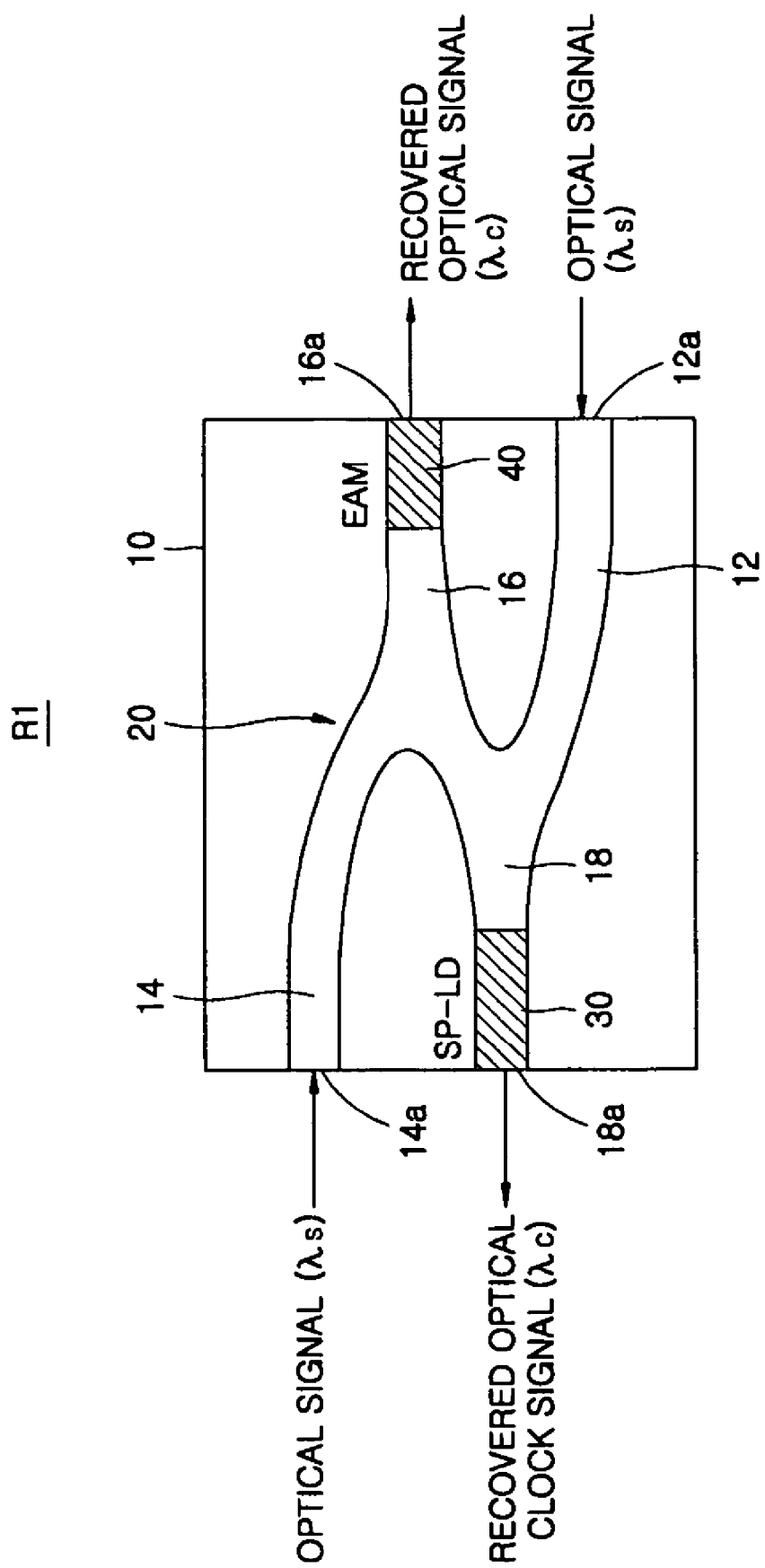
FIG. 1 shows a 3R (re-timing, re-shaping, re-amplifying) recovery system according to an embodiment of the present invention.

The present invention will be described more fully hereinafter with reference to the accompanying drawings in which exemplary embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the forms of elements are exaggerated for clarity. To facilitate understanding, identical reference numerals have been used, where possible, to designate identical elements that are common to the figures.

FIG. 1 shows a 3R (re-timing, re-shaping, re-amplifying) recovery system R1 according to an embodiment of the present invention. The 3R recovery system R1 of FIG. 1 has a double-Y-branch passive waveguide connecting structure 20 disposed on a semiconductor substrate 10. The 3R recovery system R1 is configured by integrating a self-pulsating laser diode (SP-LD) 30 and an electroabsorption modulator (EAM) 40 in the double-Y-branch passive waveguide connecting structure 20 disposed on the semiconductor substrate 10.

Referring to FIG. 1, a first Y-branch passive waveguide comprised of integrated first passive waveguide 12, second passive waveguide 16, and third passive waveguide 18 is disposed on the semiconductor substrate 10. A fourth passive waveguide 14 that is further formed on the semiconductor substrate 10 is connected to the second passive waveguide 16, thereby forming a second Y-branch passive waveguide with the third passive waveguide 18 and the second passive waveguide 16. Thus, the first through fourth passive waveguides 12, 14, 16, and 18 form the double-Y-branch passive waveguide connecting structure 20 in which double Y-branch passive waveguides are connected. A structure for connecting two multi-mode interferometers (MMI) may be used instead of the double-Y-branch passive waveguide connecting structure 20. This structure can be realized by connecting two MMI couplers. Specifically, as will be described later with reference to FIG. 3, the MMI couplers can be disposed in a region where the first passive waveguide 12 and the second passive waveguide 16 are combined with each other and connected to the third passive waveguide 18, and in a region where the fourth passive waveguide 14 and the second passive waveguide 16 are connected, respectively.

Referring to FIG. 1, the first passive waveguide 12 has a first input terminal 12a, and the second passive waveguide 16 has a first output terminal 16a. The third passive waveguide 18 connects the first passive waveguide 12 and the second passive waveguide 16, and has a second output terminal 18a. The fourth passive waveguide 14 has a second input terminal 14a. A distorted optical signal $\lambda_s$ is input to the input terminals 12a and 14a, and a recovered optical signal $\lambda_c$ and a recovered optical clock signal $\lambda_c$ are output from the first and second output terminals 16a and 18a.

The EAM 40 is formed in and integrated with the first output terminal 16a, and the SP-LD 30 is formed in and integrated with the second output terminal 18a. Accordingly, the double-Y-branch passive waveguide connecting structure 20 has the opposite first and second input terminals 12a and 14a and the opposite first and second output terminals 16a and 18a.

An anti-reflection material may be coated on both ends of each of the EAM 40 and the SP-LD 30. The SP-LD 30 outputs optical clock signal $\lambda_c$ using optical injection locking in response to a received optical signal.

The absorption of light by a semiconductor device is determined by a transition between a conduction band and a valence band. That is, incident light is absorbed by exciting electrons in the valence band toward the conduction band. Thus, light is absorbed when the energy of the light is greater than an energy gap (band gap) between the conduction band and the valence band. The band gap can be controlled to change an absorption rate.

The easiest way to change the band gap is to apply a voltage to the semiconductor device. In a semiconductor device having a two-dimensional structure, this is possible due to a quantum stark effect. A general EAM includes a waveguide core, cladding, and an electrode, and modulates input light according to a voltage applied to the electrode.

Light can be used instead of voltage to modulate input light. If very high frequency light is irradiated onto the semiconductor device, a number of electrons are generated in the conduction band. In the case of a p-n junction, these electrons are collected on a space charge layer, and as a result, a voltage is instantaneously applied to an active layer (disposed in a p-n junction) of a laser diode such that an absorption rate is changed. Using this phenomenon, optical gating can be performed using light. In general, the absorption rate of an EAM is reduced by high frequency light. Thus, high frequency light of a control beam is used for optical gating, and the optical clock signal $\lambda_c$ functions as the control beam in the EAM 40 of the 3R recovery system.

The operating principle of the 3R recovery system R1 will now be described.

The distorted optical signal $\lambda_s$ is diverged and input to two input terminals, that is, the first input terminal 12a and the second input terminal 14a, as shown in FIG. 1. When the distorted optical signal $\lambda_s$ input to the first input terminal 12a disposed on the lower right side is injected into the SP-LD 30 via the first and third passive waveguides 12 and 18, the SP-LD 30 outputs the recovered optical clock signal $\lambda_c$ using injection locking. As a result, re-timing, that is, clock recovery, of the 3R function is first performed.

The received optical clock signal $\lambda_c$ is output from the second output terminal 18a disposed on the lower left side and input to the EAM 40 via the third and second passive waveguides 18 and 16. In addition, the distorted optical signal $\lambda_s$ and input to the second input terminal 14a is input to the EAM 40 via the fourth and second passive waveguides 14 and 16. The EAM 40 receives both the received optical clock signal $\lambda_c$ and the distorted optical signal $\lambda_s$ and functions as an AND gate on the recovered optical clock signal $\lambda_c$ and the distorted optical signal $\lambda_s$ to perform optical gating, thereby performing a 2R function excluding the clock recovery of the 3R function. As such, the distorted optical signal $\lambda_s$ input to the EAM 40 is transformed into the recovered optical signal $\lambda_c$ based on the recovered optical clock signal $\lambda_c$ and is output from the first output terminal 16a.

In order to synchronize the distorted optical signal $\lambda_s$ and the received optical clock signal $\lambda_c$ input to the EAM 40, a variable optical delay line which variably controls a delay between the optical signals $\lambda_s$ diverged to be input to the EAM 40 can be used. In order to perform better gating, a phase of the optical signal $\lambda_s$ should be properly controlled. For example, two sign waves of the diverged optical signals can be made to precisely overlap. To this end, the variable optical delay line can be used.

In this way, the EAM 40 and the SP-LD 30 are integrated end disposed on the semiconductor substrate 10 so that integrated full 3R recovery system can be realized. Owing to the integrated structure, optical coupling loss is smaller than in the case where separate elements are combined with one another in the prior art, and the configuration of the 3R function is simplified and compact. In addition, because of the monolithic integration polarization dependency is reduced. Furthermore, an input signal is simply input so that the optical clock and the 3R-recovered signal can be obtained and a device in which the 3R function is performed can be realized.

Figure 2:
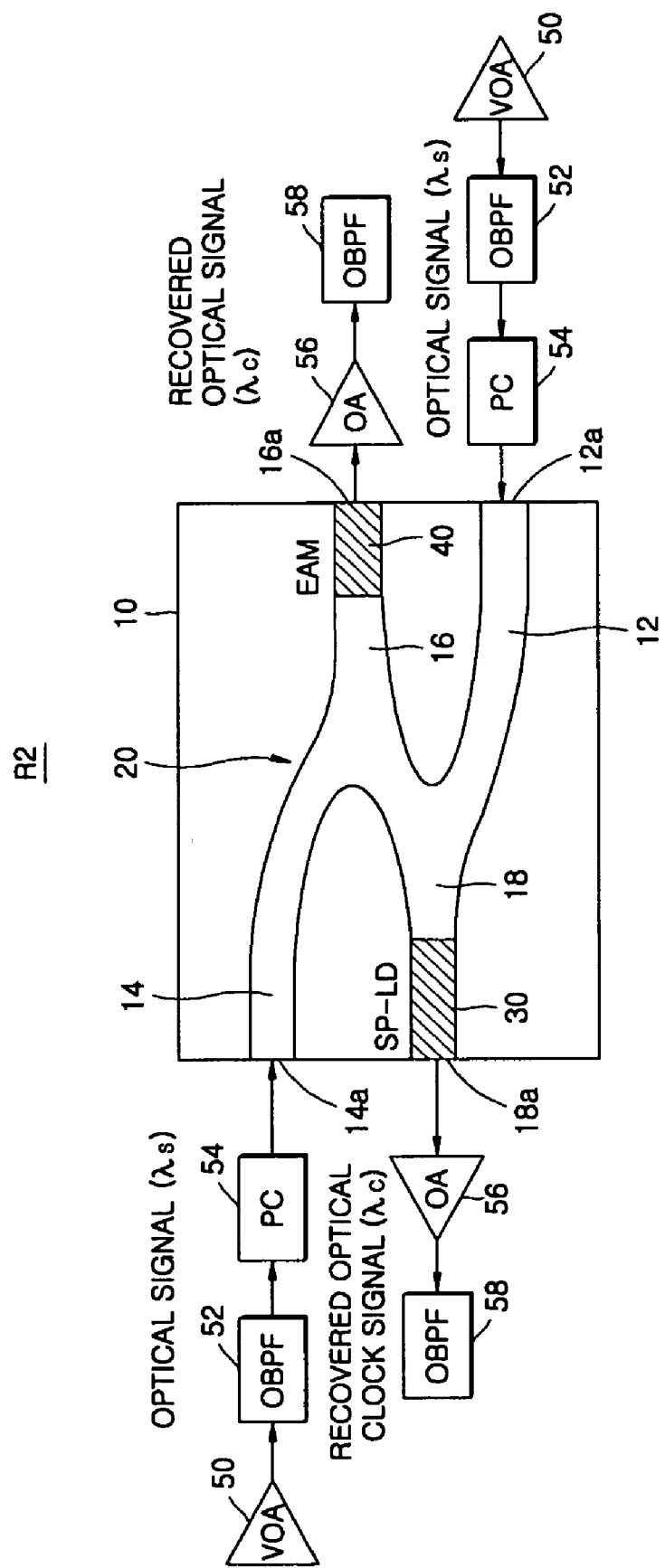
FIG. 2 shows a 3R recovery system according to another embodiment of the present invention.

FIG. 2 shows a 3R recovery system R2 according to another embodiment of the present invention. The 3R recovery system R2 of FIG. 2 includes the 3R recovery system R1 of FIG. 1 and additional optical elements.

Referring to FIG. 2, a variable optical amplifier (VOA) 50, an optical bandpass filter (OBPF) 52, and a polarization controller (PC) 54 are connected to each of the first and second input terminals 12a and 14a so that the size and polarization of the distorted optical signal $\lambda_s$ can be controlled. Specifically, the distorted optical signal $\lambda_s$ is amplified to a predetermined size by the VOA 50. A desired signal among optical signals amplified by the VOA 50 is selected by filtering by the OBPF 52. The polarization of the selected signal is controlled by the PC 54.

An optical amplifier (OA) 56 and an OBPF 58 are connected to each of the first and second output terminals 16a and 18a to separate the recovered optical signal $\lambda_c$ output from the first output terminal 16a and the recovered optical clock signal $\lambda_c$ output from the second output terminal 18a from the distorted optical signal $\lambda_s$ output together with the recovered optical signal $\lambda_c$ and the recovered optical clock signal $\lambda_c$ and amplify the recovered optical signal $\lambda_c$ and the recovered optical clock signal $\lambda_c$. Specifically, the recovered optical signal $\lambda_c$ output from the first output terminal 16a and the distorted optical signal $\lambda_c$ output together with the recovered optical signal $\lambda_c$ are amplified by the OA 56, and then the distorted optical signal $\lambda_s$ is filtered out by the OBPF 58 and only the recovered optical signal $\lambda_c$ is output. Similarly, the recovered optical clock $\lambda_c$ output from the second output terminal 18a and the distorted optical signal $\lambda_s$ output together with the recovered optical clock $\lambda_c$ are amplified by the OA 56, and then the distorted optical signal $\lambda_s$ is filtered out by the OBPF 58 and only the recovered optical clock $\lambda_c$ is output.

The drawback of optical devices is that they are very sensitive to the intensity of incident light, polarization, noise, and the like. To overcome this drawback, the OAs 50 and 56 for controlling the intensity of incident light, the OBPFs 52 and 58 for removing wavelength components not pat of signals, and the PC 54 are further used in the present embodiment.

Figure 3:
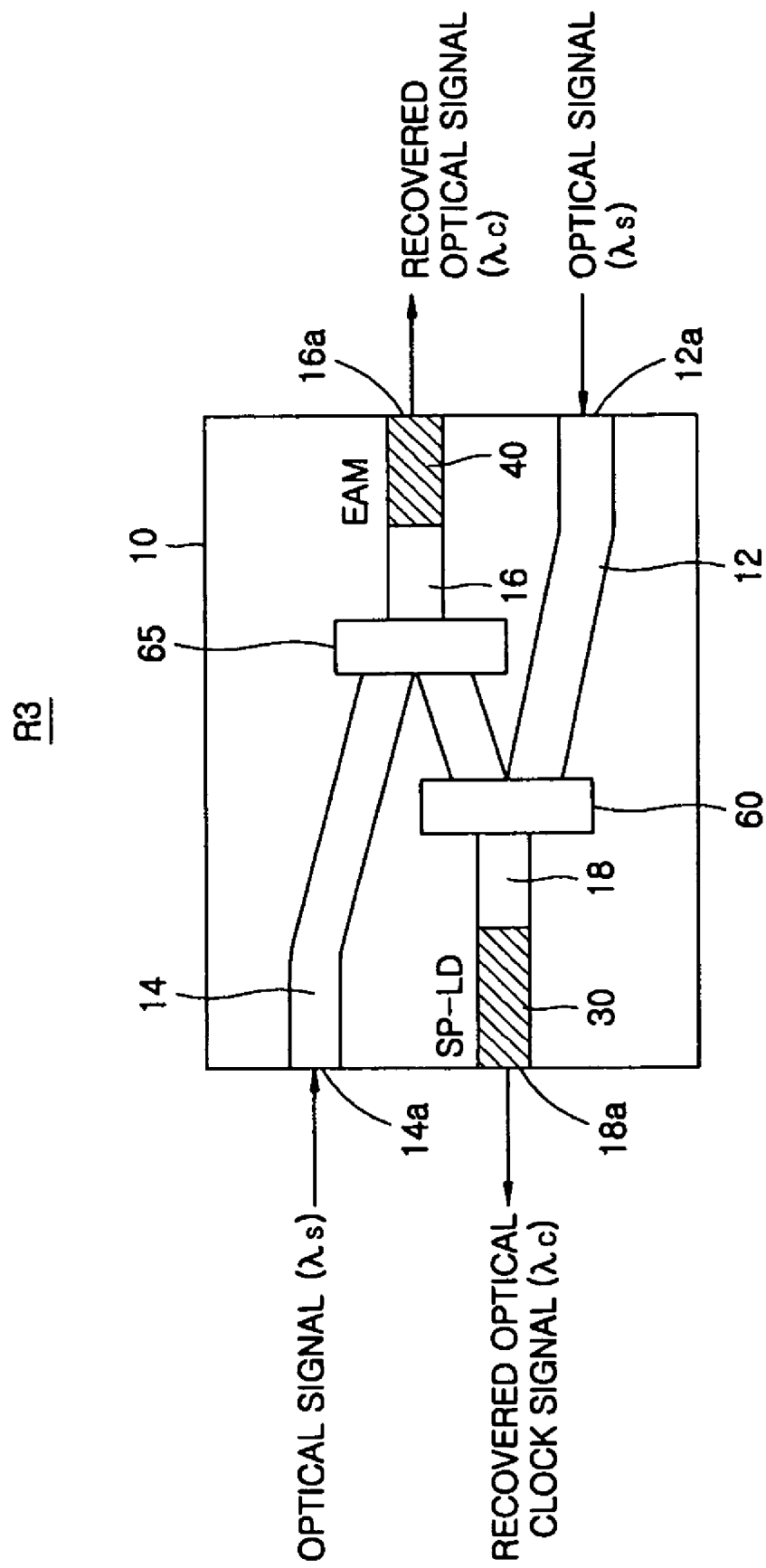
FIG. 3 shows a 3R recovery system according to another embodiment of the present invention.

FIG. 3 shows a 3R recovery system R3 according to another embodiment of the present invention. The 3R recovery system R3 of FIG. 3 includes the 3R recovery system R1 of FIG. 1 without changes and has a structure in which two MMI couplers are connected, instead of the double-Y-branch passive waveguide connecting structure 20.

Referring to FIG. 3, an MMI coupler 60 is disposed in a region where the first passive waveguide 12 and the second passive waveguide 16 are combined and is connected to the third passive waveguide 18, and an MMI coupler 65 is disposed in a region where the fourth passive waveguide 14 and the second passive waveguide 16 are combined. The operating principle of the 3R recovery system R3 is the same as the operating principle of the 3R recovery system R1 of FIG. 1.

Figure 4:
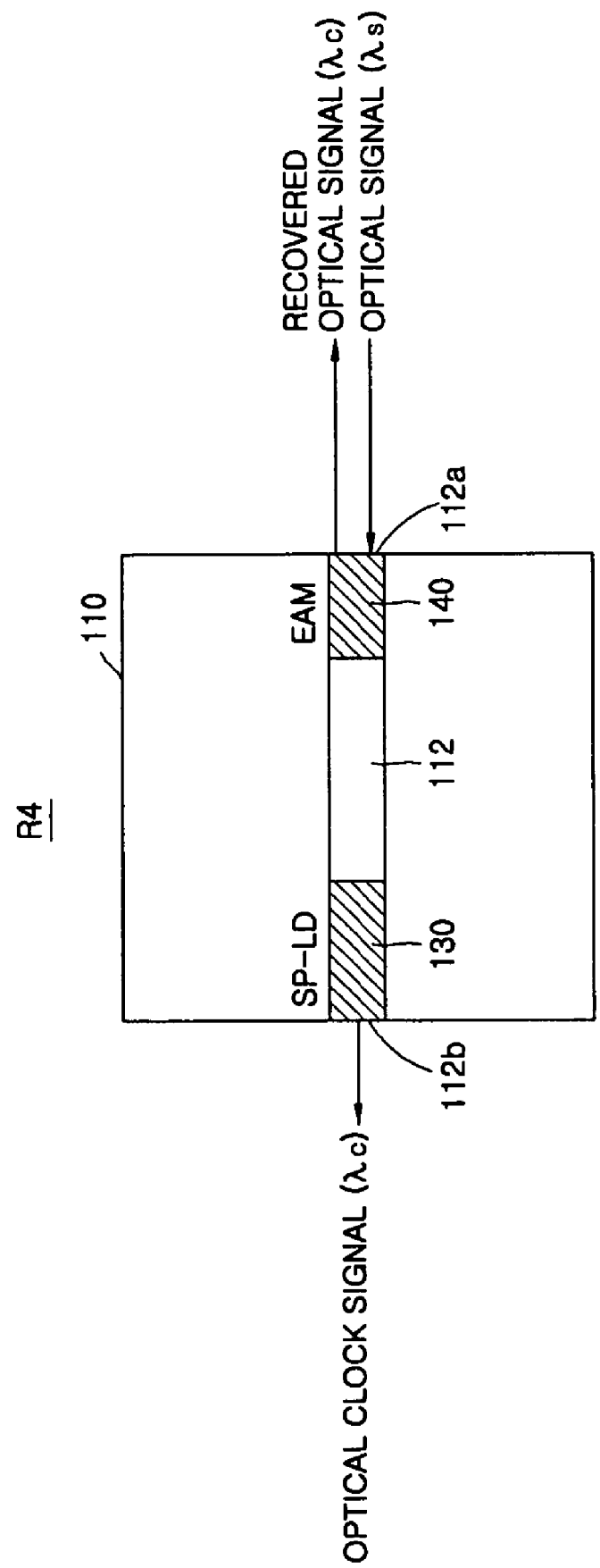
FIG. 4 shows a 3R recovery system according to another embodiment of the present invention.

FIG. 4 shows a 3R recovery system R4 according to another embodiment of the present invention. The 3R recovery system R4 of FIG. 3 is an integrated full 3R recovery system in which a self-pulsating laser diode (SP-LD) 130 and an electroabsorption modulator (EAM) 140 are connected to each other via a straight passive waveguide 112 having an input/output terminal 112a and an output terminal 112b disposed on a semiconductor substrate 10. A distorted optical signal $\lambda_s$ is input to the input/output terminal 112a, a recovered optical signal $\lambda_c$ is output from input/output terminal 112a, and a recovered optical clock signal $\lambda_c$ is output to the output terminal 112b. An anti-reflection material may be coated on both ends of each of the EAM 140 and the SP-LD 130.

The operating principle of the 3R recovery system R4 having the integrated structure will now be described.

The distorted optical signal $\lambda_s$ is input to the right input/output terminal 112a. The EAM 140 performs optical gating using the distorted optical signal $\lambda_s$, and the distorted optical signal $\lambda_s$, which has a reduced size (even though an absorption rate is controlled, optical loss occurs, and thus, the size of the distorted optical signal $\lambda_s$ is reduced), is input to the SP-LD 130 along the passive waveguide 112. The SP-LD 130 outputs the recovered optical, clock signal $\lambda_c$ using injection locking. The restored optical clock signal $\lambda_c$ is output from the output terminal 112b to the EAM 140 via the passive waveguide 112. As a result of optical gating performed by the EAM 140, the restored optical clock signal $\lambda_c$ input to the EAM 140 is output from the right input/output terminal 112a as the recovered optical signal $\lambda_c$. The length of the passive waveguide 112 is determined such that the restored optical signal $\lambda_c$ and the restored optical clock signal $\lambda_c$ input to the EAM 140 are synchronized.

The length of the passive waveguide 112 is determined such that, when data is transferred from the EAM 140 to the SP-LD 130 at a rate of 40 Gbps, the time taken by the distorted optical signal $\lambda_c$ to proceed from the center of the EAM 140 to the center of the SP-LD 130 is an integral multiple of 25 ps. Alternatively, the length of the passive wavelength 112 is determined such that a data transfer rate of 10 Gbps results in the time taken by the distorted optical signal $\lambda_c$ to proceed from the center of the EAM 140 to the center of the SP-LD 130 being an integral multiple of 100 ps. Since light having a wavelength of 100 μm proceeds from the center of the EAM 140 to the center of the SP-LD 130 in 1 ps at the passive waveguide 112 in a current wavelength area of 1.5 μm, light proceeds from the center of the EAM 140 to the center of the SP-LD 130 in 25 ps when the data transfer rate is 40 Gbps. Even if light has a resolution of 0.5 ps, a precision of the light of 50 μm is sufficient to perform a process. However, since a length error in process does not exceed 5 μm, synchronization can be performed at a resolution of 0.05 ps.

Figure 5:
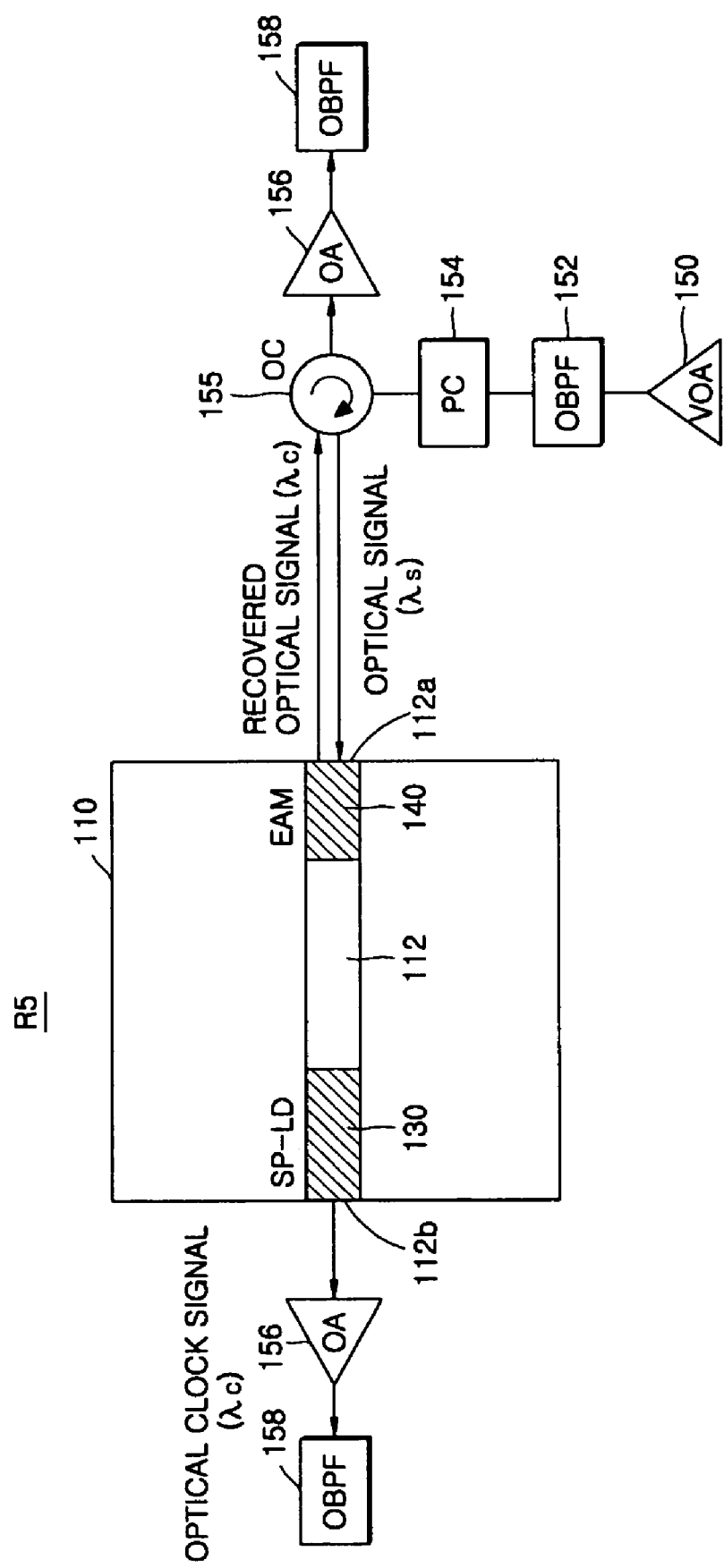
FIG. 5 shows a 3R recovery system according to another embodiment of the present invention.

FIG. 5 shows a 3R recovery system R5 according to another embodiment of the present invention. The 3R recovery system R5 of FIG. 5 includes the 3R recovery system R4 of FIG. 4 and additional optical elements.

In order to control the size and polarization of the distorted optical signal $\lambda_s$, a VOA 150 which amplifies the distorted optical signal $\lambda_s$ to a predetermined size, an OBPF 152 which filters a desired signal among the amplified optical signals $\lambda_s$, and a PC 154 which controls the polarization of the distorted optical signal $\lambda_s$ can be connected to the input/output terminal 112a.

In order to separate a direction of the recovered optical signal $\lambda_c$ output from the input/output terminal 112a and a direction of the distorted optical signals $\lambda_s$, an optical circulator (OC) 155 can be used. In order to separate and amplify the recovered optical signal $\lambda_c$ output from the input/output terminal 112a and the recovered optical clock signal $\lambda_c$ output from the output terminal 112b from the distorted optical signal $\lambda_s$ output together with the recovered optical signal $\lambda_c$ and the recovered optical clock signal $\lambda_c$, an optical amplifier (OA) 156 and an optical bandpass filter (OBPF) 158 can be used.

As described above, in the 3R recovery system according to the present invention, an SP-LD is integrated with an EAM such that an integrated 3R recovery system that can be simply mounted on one semiconductor substrate is realized.

According to the present invention, since the 3R recovery system has an integrated structure, optical coupling loss is smaller than in the case where separate elements are combined with one another in the prior art, and the configuration of the 3R function is simplified and compact. In addition, monolithic integration is performed such that polarization dependency is reduced.

Furthermore, an input signal is simply input such that the optical clock signal and the 3R-recovered optical signal can be obtained and a device in which the 3R function is performed can be realized. In particular, the 3R function can be performed using one signal.

In the full 3R recovery system of the present invention, the 3R function is performed by inputting an optical signal without electrical optical transformation or photoelectric transformation or the use of an electrical PLL circuit, and is a single device, and thus can be easily used.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A full 3R (re-timing, re-shaping, re-amplifying) recovery system comprising:
    a self-pulsating laser diode (SP-LD) outputting a recovered optical clock signal from an inputted distorted optical signal;
    an electroabsorption modulator (EAM) receiving the recovered optical clock signal and the inputted distorted optical signal and recovering an optical signal based on the recovered optical clock signal, and
    a passive waveguide having a first output terminal and a second output terminal, the passive waveguide connecting the SP-LD and EAM,
        wherein all of the SP-LD for 3R recovery, the EAM for 3R recovery, and the passive waveguide connecting the SP-LD and EAM are integrated and disposed on a same surface of a semiconductor substrate,
        wherein the inputted distorted optical signal is inputtable directly to the integrated full 3R recovery system to obtain an optical clock signal and a 3R-recovered signal without electrical optical transformation such that optical coupling loss is less than in the case where separate elements are combined, and
        wherein the EAM is formed in and integrated with the first output terminal of the passive waveguide and the SP-LD is formed in and integrated with the second output terminal of the passive waveguide to reduce the optical coupling loss.

2. The full 3R recovery system of claim 1, further comprising a double-Y-branch passive waveguide connecting structure connecting the SP-LD and the EAM.

3. The full 3R recovery system of claim 2, wherein the double-Y-branch passive waveguide connecting structure has two opposite input terminals and two opposite output terminals and the EAM and the SP-LD are respectively integrated in the two output terminals.

4. The full 3R recovery system of claim 1, further comprising a passive waveguide including two multi mode-interference (MMI) couplers connecting the SP-LD and the EAM.

5. The full 3R recovery system of claim 1, further comprising a straight passive waveguide connecting the SP-LD and the EAM.

6. The full 3R recovery system of claim 1, wherein an anti-reflection material is coated on both ends of each of the SP-LD and the EAM.

7. A full 3R (re-timing, re-shaping, re-amplifying) recovery system comprising:
    a first passive waveguide that is integrated and disposed on a semiconductor substrate and has a first input terminal;
    a second passive waveguide that is integrated and disposed on the semiconductor substrate and has a first output terminal;
    an electroabsorption modulator (EAM) integrated with the semiconductor substrate and formed in and integrated with the first output terminal to reduce an optical coupling loss, receiving a recovered optical clock signal and an inputted distorted optical signal, and recovering an optical signal based on the recovered optical clock signal;
    a third passive waveguide that is integrated and disposed on the semiconductor substrate and has a second output terminal;
    a self-pulsating laser diode (SP-LD) integrated with the semiconductor substrate and formed in and integrated with the second output terminal to reduce the optical coupling loss and outputting the recovered optical clock signal from the inputted distorted optical signal; and
    a fourth passive waveguide that is integrated and disposed on the semiconductor substrate and has a second input terminal,
        wherein all of the first, second, third, fourth passive waveguides, EAM for 3R recovery, and SP-LD for 3R recovery are integrated and disposed on a same surface of the semiconductor substrate, the second passive waveguide is connected to the first and third passive waveguides, the third waveguide is connected to the second and fourth passive waveguides and
        wherein the inputted distorted optical signal is inputtable directly to the integrated full 3R recovery system to obtain an optical clock signal and a 3R-recovered signal without electrical optical transformation such that the optical coupling loss is less than in the case where separate elements are combined.

8. The full 3R recovery system of claim 7, wherein the first passive waveguide, the second passive waveguide and the third passive waveguide are connected by one Y-branch passive waveguide, and the fourth passive waveguide, the third passive waveguide and the second passive waveguide are connected by another Y-branch passive waveguide.

9. The full 3R recovery system of claim 7, further comprising a multi mode-interference (MMI) coupler disposed in a region where the second passive waveguide is connected to the first and third passive waveguides, and an MMI coupler in a region where the third passive waveguide is connected to the second and fourth passive waveguides.

10. The full 3R recovery system of claim 7, wherein an anti-reflection coating material is coated on both ends of each of the SP-LD and the EAM.

11. The full 3R recovery system of claim 7, further comprising an optical amplifier (OA) and an optical bandpass filter (OBPF) connected to each of the first and second output terminals.

12. The full 3R recovery system of claim 7, further comprising a variable optical amplifier (VOA), an optical bandpass filter (OBPF), and a polarization controller (PC) connected to each of the first and second input terminals.

13. The full 3R recovery system of 12, further comprising an optical amplifier (OA) and an OBPF connected to each of the first and second output terminals.

14. A full 3R (re-timing, re-shaping, re-amplifying) recovery system comprising:
   a straight passive waveguide that is integrated and disposed on a semiconductor substrate and has an input/output terminal and an output terminal disposed at opposite ends;
   an electroabsorption modulator (EAM) integrated with the semiconductor substrate and formed in and integrated with the input/output terminal to reduce an optical coupling loss, receiving a recovered optical clock signal and an inputted distorted optical signal1 and recovering an optical signal based on the recovered optical clock signal; and
   a self-pulsating laser diode (SP-LD) integrated with the semiconductor substrate and formed in and integrated with the output terminal to reduce the optical coupling loss and outputting the recovered optical clock signal from the inputted distorted optical signal,
      wherein all of the straight passive waveguide, EAM for 3R recovery, and SP-LD for 3R recovery are integrated and disposed on a same surface of the semiconductor substrate, and
      wherein the inputted distorted optical signal is inputtable directly to the integrated full 3R recovery system to obtain an optical clock signal and a 3R- recovered signal without electrical optical transformation such that optical the coupling loss is less than in the case where separate elements are combined.

15. The full 3R recovery system of claim 14, wherein an anti-reflection coating material is coated on both ends of each of the SP-LD and the EAM.

16. The full 3R recovery system of claim 14, further comprising an optical amplifier (OA) and an optical bandpass filter (OBPF) connected to each of the input/output terminal and the output terminal.

17. The full 3R recovery system of claim 16, further comprising a variable optical amplifier (VOA) at the input/output terminal, and an optical circulator that is connected between the input/output terminal, the VOA and the OA connected to the input/output terminal.

18. The full 3R recovery system of claim 14, further comprising a variable optical amplifier (VOA), an optical bandpass filter (OBPF), and a polarization controller (PC) connected to the input/output terminal.

19. The full 3R recovery system of claim 18, further comprising an optical amplifier (OA) and an optical bandpass filter (OBPF) connected to each of the input/output terminal and the output terminal.

20. The full 3R recovery system of claim 19, further comprising an optical circulator connected between the input/output terminal, the VOA and the OA connected to the input/output terminal.

* * * * *